(12) United States Patent
Zhang et al.

(10) Patent No.: US 12,524,540 B2
(45) Date of Patent: Jan. 13, 2026

(54) MALICIOUS PATTERN EXTRACTION VIA FUZZING

(71) Applicant: Palo Alto Networks, Inc., Santa Clara, CA (US)

(72) Inventors: Zhibin Zhang, Santa Clara, CA (US); Bo Qu, Saratoga, CA (US); Tao Yan, San Jose, CA (US); ChienHua Lu, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 368 days.

(21) Appl. No.: 18/141,093

(22) Filed: Apr. 28, 2023

(65) Prior Publication Data

US 2024/0362327 A1   Oct. 31, 2024

(51) Int. Cl.
*G06F 21/56* (2013.01)
(52) U.S. Cl.
CPC .......... *G06F 21/564* (2013.01); *G06F 21/566* (2013.01); *G06F 2221/034* (2013.01)
(58) Field of Classification Search
CPC ................. G06F 21/564; G06F 21/566; G06F 2221/034; G06F 21/56
See application file for complete search history.

(56) References Cited

U.S. PATENT DOCUMENTS

| | | | |
|---|---|---|---|
| 8,261,366 B2 | 9/2012 | Shuster | |
| 8,407,789 B1 | 3/2013 | Mears | |
| 8,448,245 B2 | 5/2013 | Banerjee | |
| 8,499,283 B2 | 7/2013 | Mony | |
| 8,997,219 B2 | 3/2015 | Staniford | |
| 10,783,247 B1* | 9/2020 | Steinfadt | ............... G06F 21/564 |
| 2006/0064755 A1* | 3/2006 | Azadet | .................. H04L 63/145 |
| | | | 726/24 |
| 2011/0247072 A1 | 10/2011 | Staniford | |
| 2011/0289582 A1 | 11/2011 | Kejriwal | |
| 2012/0084859 A1 | 4/2012 | Radinsky | |

(Continued)

FOREIGN PATENT DOCUMENTS

EP    4254869 A2 *  10/2023  ......... H04L 63/1441

OTHER PUBLICATIONS

Babu et al., "Adaptive Ordering of Pipelined Stream Filters", 2014.

(Continued)

*Primary Examiner* — Jayesh M Jhaveri
(74) *Attorney, Agent, or Firm* — Van Pelt, Yi & James LLP

(57) ABSTRACT

Various techniques for malicious pattern extraction via fuzzing are disclosed. In some embodiments, a system/process/computer program product for malicious pattern extraction via fuzzing includes receiving a malicious sample (e.g., the malicious sample can be an executable file, such as a binary, script, etc., or a file that includes content for inputting into an application, such as for an office productivity suite or another application); mutating the malicious sample using fuzzing; and generating a signature based on a critical path (e.g., a malware signature can be automatically generated by a cloud security service for detection of the malicious sample, and the cloud security service can distribute the malware signature to a plurality of firewalls and/or other security entities to subscribers of a security service).

18 Claims, 12 Drawing Sheets

(56) References Cited

U.S. PATENT DOCUMENTS

| | | |
|---|---|---|
| 2013/0097705 A1 | 4/2013 | Montoro |
| 2013/0145466 A1 | 6/2013 | Richard |
| 2019/0065746 A1* | 2/2019 | Alsulami ................ G06F 21/10 |
| 2024/0259347 A1* | 8/2024 | Grover ................ H04L 63/1425 |

OTHER PUBLICATIONS

Dynamorio, Existing DynamoRIO-Based Tools, downloaded Apr. 27, 2023.

Jarle Kittilsen, "Detecting malicious PDF documents", master thesis for Department of Computer Science and Media Technology, Gjøvik University College, Norway; Jan. 12, 2011.

Laskov et al., 2011, Static Detection of Malicious JavaScript-Bearing PDF Documents, In Proceedings of the 27th Annual Computer Security Applications Conference (ACSAC '11). ACM, New York, NY, USA, 373-382. D0I=10.1145/2076732.2076785 http://doi.acm.org/10.1145/2076732.2076785.

Paul Baccas, Finding Rules for Heuristic Detection of Malicious PDFS: with Analysis of Embedded Exploit Code, Virus Bulletin Conference, Sep. 2010.

Tao et al., A Novel Framework for Learning to Detect Malicious Web Pages, 2010 International Forum on Information Technology and Applications, IEEE 2010.

Wikipedia, How to get a Backtrace with WinDbg—The Document Foundation Wiki, downloaded Apr. 27, 2023.

* cited by examiner

● poc.js — Edited

● ALTER TABLE [ft7] ADD COLUMN [fc5] Binary (464);
● INSERT INTO [ft7] ([fc0], [fc1], [fc2], [fc3], [fc4], [fc5]) VALUES ('5', '⌐', '⌐', '8', '~', '\\\\\\\\\\',
  'ʮϹϠϲϧϿϾϥϸϟϹϾϟʃϿϡ', '0', 'ʀ, Ë, €, Γ');

FIG. 5B

MALICIOUS PATTERN EXTRACTION VIA FUZZING

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIGS. 4A-E and 5A-B illustrate example use cases for malicious pattern extraction via fuzzing in accordance with some embodiments.

DETAILED DESCRIPTION

Figure 1:
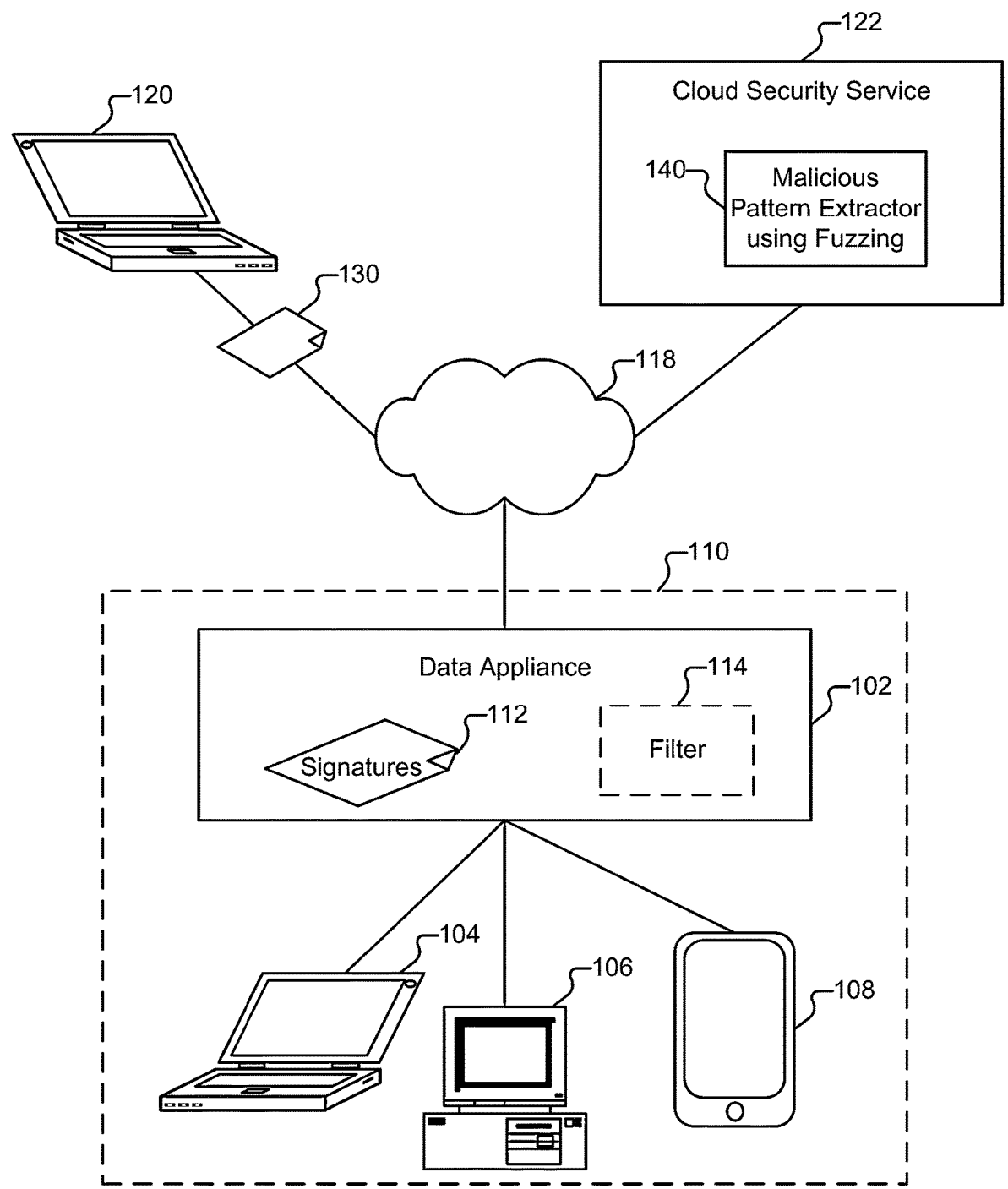
FIG. 1 illustrates an example of an environment in which samples are analyzed for malware in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Overview of Techniques for Malicious Pattern Extraction Via Fuzzing

Generally, determining a crash point/path in a file that can trigger a bug in software that results in a crash (e.g., a software/system crash) is a labor intensive and time consuming activity for security researchers. Further, it is technically challenging to create signatures that can efficiently and effectively detect such malicious files. For example, even if security researchers have the original benign file, it typically still requires significant time and effort by security researchers to extract the malicious patterns that can be used to generate an effective signature for malware detection of such files.

As such, what is needed are new and improved techniques for malicious pattern extraction to generate signatures for malware.

Accordingly, new and improved techniques for malicious pattern extraction via fuzzing are disclosed.

In programming and software development, fuzzing or fuzz testing is a software testing techniques that generally includes providing invalid, random, and/or unexpected data as input to a computer program (e.g., the software). The computer program is monitored for exceptions, such as crashes, potential memory leaks, and/or other errors/failures.

As such, fuzzing can be used for testing software (e.g., computer software), such as for identifying bugs in the software. A bug as used herein generally refers to an error, flaw, or fault in the design, development, and/or operation of software that causes it to produce an incorrect or unexpected result, or to behave in undesired and/or unintended ways.

However, as disclosed herein with respect to various embodiments, fuzzing can also be applied to provide an effective and efficient solution to help developers and/or security researchers to locate the critical patterns of a malicious sample (e.g., malicious file, such as a malicious executable file) by observing whether a crash and/or exploit succeeds or not. For example, given a malicious sample, the malicious sample can be automatically monitored while opening it with one or more vulnerable applications (e.g., APPs) or executing the sample if it is an executable binary/script (e.g., executing the malicious sample if it is an executable sample/binary, such as a Microsoft PE file, etc., and/or inputting the malicious sample into an appropriate application, such as inputting an Excel file into Microsoft Excel, a PDF file into Adobe Acrobat, a PPT file into Microsoft PPT, a Word document into Microsoft Word, etc.) and the output can be saved. Then the disclosed fuzzing techniques can be performed to compare and save the information when a different output is observed during the monitoring of the fuzzing operations performed on the malicious sample during execution. Based on the observed and saved results, the critical patterns for the malicious sample and offsets can be automatically detected, which leads to a vulnerable branch of execution. As a result, the pattern and offset can then be automatically mapped to the original structures or statements of the file type to facilitate generation of an accurate coverage for the malicious sample and other potential crashes and/or exploits associated with the malicious sample. The results can then be applied to facilitate automated signature generation for the malicious sample as will be further described below with respect to various embodiments.

In some embodiments, a system/process/computer program product for malicious pattern extraction via fuzzing includes receiving a malicious sample (e.g., the malicious sample can be an executable file, such as a binary, script, etc., or a file that includes content for inputting into an application, such as for an office productivity suite or another application); mutating the malicious sample using fuzzing; and generating a signature based on a critical path (e.g., a malware signature can be automatically generated by a cloud security service for detection of the malicious sample, and the cloud security service can distribute the malware signature to a plurality of firewalls and/or other security entities to subscribers of a security service).

For example, the cloud security service can distribute the automatically generated malware signature to subscribers of a security service for intrusion detection system (IDS) and/or an intrusion prevention system (IPS). As another example, the cloud security service can distribute the automatically generated malware signature to a plurality of firewalls to subscribers of a security service.

In one embodiment, a system/process/computer program product for malicious pattern extraction via fuzzing further includes verifying the signature to check for false positives.

In one embodiment, a system/process/computer program product for malicious pattern extraction via fuzzing further includes analyzing an execution flow of the malicious sample to identify mutation targets for fuzzing.

In one embodiment, a system/process/computer program product for malicious pattern extraction via fuzzing further includes monitoring execution of the malicious sample after each mutation to detect any anomalous behavior and repeat until no anomalous behavior is detected to identify any critical path(s) for automated signature generation for the malicious sample.

In one embodiment, a system/process/computer program product for malicious pattern extraction via fuzzing further includes monitoring execution of the malicious sample after each mutation to detect any anomalous behavior and repeat for each branch of execution until no anomalous behavior is detected to identify any critical path(s) for automated signature generation for the malicious sample; and identifying the critical path(s) for automated signature generation for the malicious sample.

As such, the disclosed techniques facilitate providing effective, efficient, and automated malicious pattern extraction via fuzzing.

In addition, the disclosed techniques allow for precise coverage of known and unknown samples by comprehensive evaluation of the malicious sample (e.g., malicious file).

Further, the disclosed techniques are adaptive as well as scalable for both binary and text-based samples.

Accordingly, new and improved security solutions that facilitate malicious pattern extraction via fuzzing are disclosed in accordance with some embodiments.

These and other embodiments and examples for malicious pattern extraction via fuzzing will be further described below.

Example System Embodiments for Malicious Pattern Extraction Via Fuzzing

FIG. 1 illustrates an example of an environment in which samples are analyzed for malware in accordance with some embodiments. In the example shown in FIG. 1, client devices 104-108 are a laptop computer, a desktop computer, and a tablet (respectively) present in an enterprise network 110. Data appliance 102 is configured to enforce policies regarding communications between clients, such as clients 104 and 106, and nodes outside of enterprise network 110 (e.g., reachable via external network 118). Examples of such policies include ones governing traffic shaping, quality of service, and routing of traffic. Other examples of policies include security policies, such as ones that include the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110.

Data appliance 102 can be configured to analyze various types of files, such as PDF documents and/or text or binary files (e.g., that can include executable content, such as computer programs, scripts, etc.), for the presence of malicious elements. As one example, suppose a nefarious user of host 120 attempts to transmit a malicious PDF document 130 to client 104 via network 118. The nefarious individual hopes that a user of client 104 will open the compromised PDF in a reader application, allowing the PDF to exploit a vulnerability in the reader to ultimately run arbitrary code on client 104. Appliance 102 is configured to inspect the document and only provide the document to client 104 if the document is determined to be benign.

In some embodiments, data appliance 102 maintains a list of signatures 112. The signatures can correspond to known malicious files (or portions thereof) and can also correspond to known safe files. If a signature associated with document 130 is present in the list of known malicious file signatures, data appliance 102 can take an appropriate action, such as preventing the transmission of the file to client 104, generating an alert, quarantining the file, etc. Similarly, if another file is received (e.g., for client 106) and has a signature corresponding to a known-benign file, then the file can be delivered accordingly. Data appliance 102 may generate such signatures itself; it may also/instead receive a list of signatures of known-malicious files as part of a subscription provided by cloud security service 122 that implements a malicious pattern extractor using fuzzing component 140 as will be further described below with respect to various embodiments.

In some cases, data appliance 102 may not have a signature that corresponds to file 130. Analysis can be performed on the file to determine whether to allow its transmission to client 104 or not. In some implementations, data appliance 102 can also include a filter 114 that can quickly identify benign files with high precision. The filtering can be used as a pre-process to allow computational resources to be focused on performing in-depth and/or dynamic analysis of likely malicious files (e.g., potentially malicious samples). Filter 114 can implement machine learning techniques. In particular, a set of features that are predictive of malicious content in a file, such as a PDF or other file types, can be selected and used to derive a classification model. The model can be trained on known benign and known malicious files (e.g., PDF files, Word documents, etc.).

In some embodiments, appliance 102 performs the in-depth analysis of documents flagged as likely malicious by filter 114 (e.g., and in some cases, can include malicious pattern extractor using fuzzing component 140). In other embodiments, appliance 102 performs the in-depth analysis at least in part in cooperation with one or more additional appliances. As one example, data appliance 102 can be configured to provide copies of samples (e.g., files) identified by filter 114 as likely malicious to cloud security service 122 for in-depth real-time analysis using malicious pattern extractor using fuzzing component 140 as will be further described below with respect to various embodiments.

If a sample (e.g., file) is ultimately determined to be malicious (whether by appliance 102, service 122, or a combination of the two), appliance 102 can automatically block the transmission of the file to client 104 (e.g., and any other applicable clients) based on the analysis result. Further, a signature can be automatically generated using malicious pattern extractor using fuzzing component 140 and distributed (e.g., to other data appliances) to automatically block future file transfer requests to download the malicious file.

Figure 2:
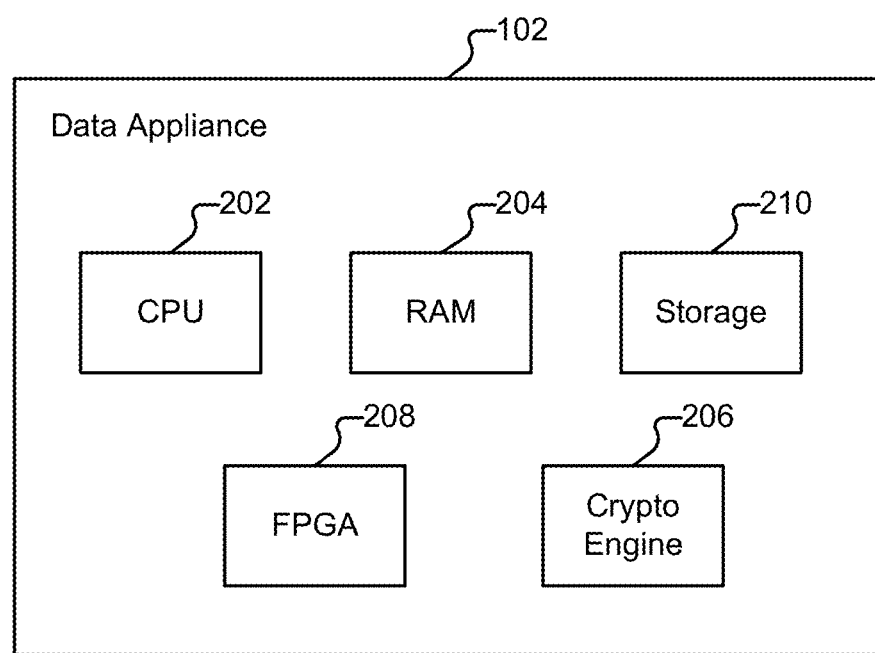
FIG. 2 illustrates an embodiment of a data appliance.

FIG. 2 illustrates an embodiment of a data appliance. The example shown is a representation of physical components that are included in appliance 102, in some embodiments. Specifically, appliance 102 includes a high performance multi-core CPU 202 and RAM 204. Appliance 102 also includes a storage 210 (e.g., one or more hard disks and/or other data storage components), which is used to store policy (e.g., a security policy) and other configuration information, signatures, and other information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Appliance 102 can take a variety of forms. For example, appliance 102 can be a dedicated device or set of devices. The functionality provided by appliance 102 can also be integrated into or executed as software (e.g., including, for example, as a virtual machine, container, etc.) on a general purpose computer, a computer server, a gateway, and/or a network/routing device. For example, in some embodiments, services provided by data appliance 102 are instead (e.g., or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable.

Figure 3:
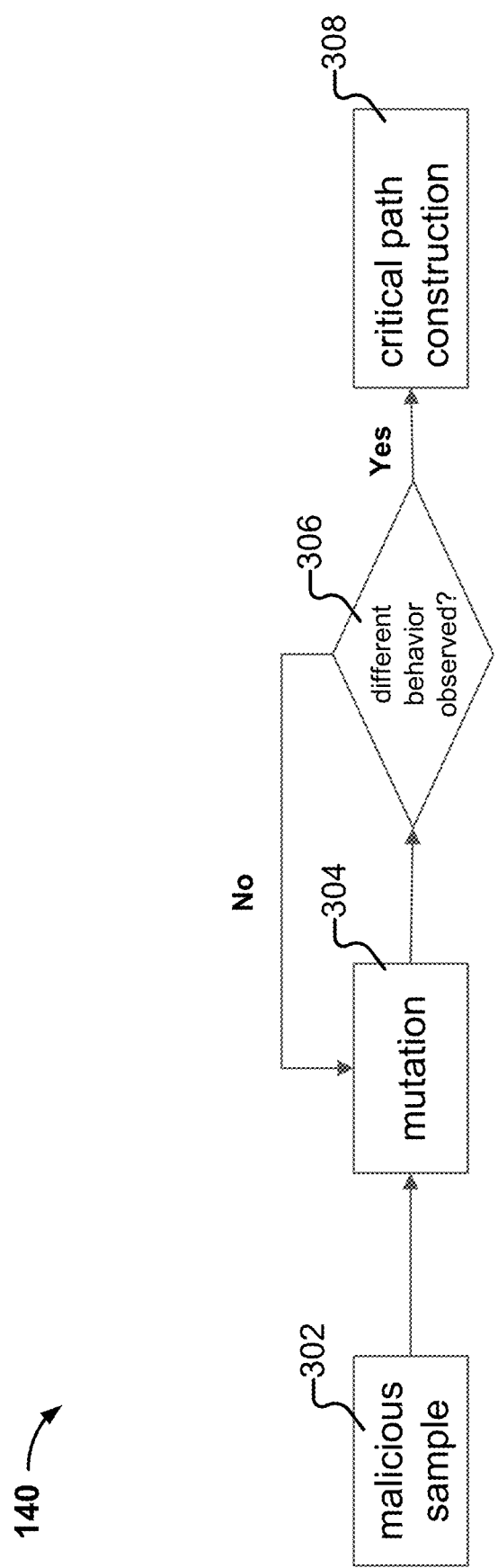
FIG. 3 is a diagram illustrating the operations performed by a malicious pattern extractor using a fuzzing component in accordance with some embodiments.

FIG. 3 is a diagram illustrating the operations performed by a malicious pattern extractor using a fuzzing component in accordance with some embodiments. Specifically, FIG. 3 illustrates the operations performed by malicious pattern extractor using fuzzing component 140, as shown in FIG. 1, in accordance with some embodiments.

Referring to FIG. 3, the disclosed malicious pattern extractor using fuzzing techniques facilitate automatically identifying any vulnerable path(s)/branch(es) and generating a set of critical patterns that can be used for automated signature generation for malicious samples. The processing operations begin at 302 as a malicious sample is received at malicious pattern extractor using fuzzing component 140.

In this example implementation, the malicious sample is automatically monitored while opening it with one or more vulnerable applications (e.g., APPs) and the output can be saved. As shown at 304, the disclosed fuzzing techniques can be performed using a mutation/fuzzer component to modify/mutate the sample (e.g., targeted fuzzing of the content/code of the sample based on analysis of an execution flow of the malicious sample to identify mutation targets for fuzzing) to compare and save the information when a different output is observed during the monitoring of the behavior (e.g., does it crash or perform some other unexpected behavior) of the modified/mutated sample on the malicious sample during execution (e.g., executing the sample if it is an executable sample/binary, such as a Microsoft PE file, etc., and/or inputting the sample into an appropriate application, such as inputting an Excel file into Microsoft Excel, a PDF file into Adobe Acrobat, a PPT file into Microsoft PPT, a Word document into Microsoft Word, etc.). At 306, whether a different behavior is observed is determined. If not, then processing returns to stage 304 for generating another targeted mutation (e.g., based on an automated analysis of the code/content of the sample) for observation as similarly described above. As such, these fuzzing operations facilitate identification of a critical path that reveals relevant aspects/attributes (e.g., conditions) associated with the sample that can be effectively and efficiently used for automated malware signature generation. The recursive loop can be implemented to not exceed a maximum number of n cycles. Otherwise, processing proceeds to stage 308 for critical path generation (e.g., using the last set/subset of unsuccessful mutations, prior to the mutation(s) that yield to a successful result/no crash etc.).

In an example implementation, fuzzing of the content/code of the sample is targeted based on analysis of an execution flow of the malicious sample to identify mutation targets for fuzzing. The targeted fuzzing of the content/code of the sample based on analysis of an execution flow of the malicious sample to identify mutation targets for fuzzing can be performed by using a combination of the following: (1) a crash backtrace to analyze the call stack and execution of the crash point (e.g., see https://wiki.documentfoundation.org/How_to_get_a_backtrace_with_WinDbg); and (2) a run time instrumentation tool (e.g., the commercially available DynamoRIO runtime instrumentation tool, which is available at https://dynamorio.org/, or another commercially available run time instrumentation tool can be similarly used) to hook/insert code for monitoring the execution of the malicious sample.

As shown at 308, based on the observed and saved results, the critical patterns for the malicious sample and offsets can be automatically detected, which leads to a vulnerable branch of execution. As a result, the pattern and offset can then be automatically mapped to the original structures or statements of the file type to facilitate generation of an accurate coverage for the malicious sample and other potential crashes and/or exploits associated with the malicious sample. The results can then be applied to facilitate automated signature generation for the malicious sample.

In this example implementation, automated signature generation is performed based on a selection of the identified critical patterns based on the above-described processing of the malicious sample using fuzzing techniques. Further, the automated signature generation can include false positive (FP) checks to verify that the automatically generated signature accurately detects such malicious samples without a low FP rate (FPR) (e.g., 0.01% or another threshold FPR).

Example Use Cases for Malicious Pattern Extraction Via Fuzzing

FIGS. 4A-E and 5A-B illustrate example use cases for malicious pattern extraction via fuzzing in accordance with some embodiments.

Figure 4A:
Figure 4B:
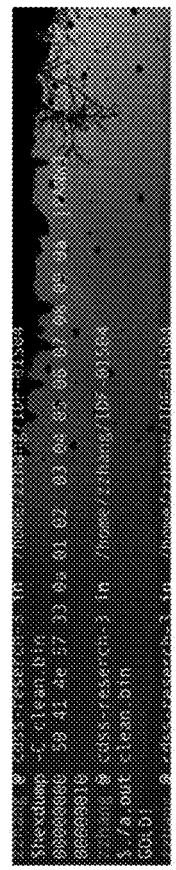
Figure 4C:
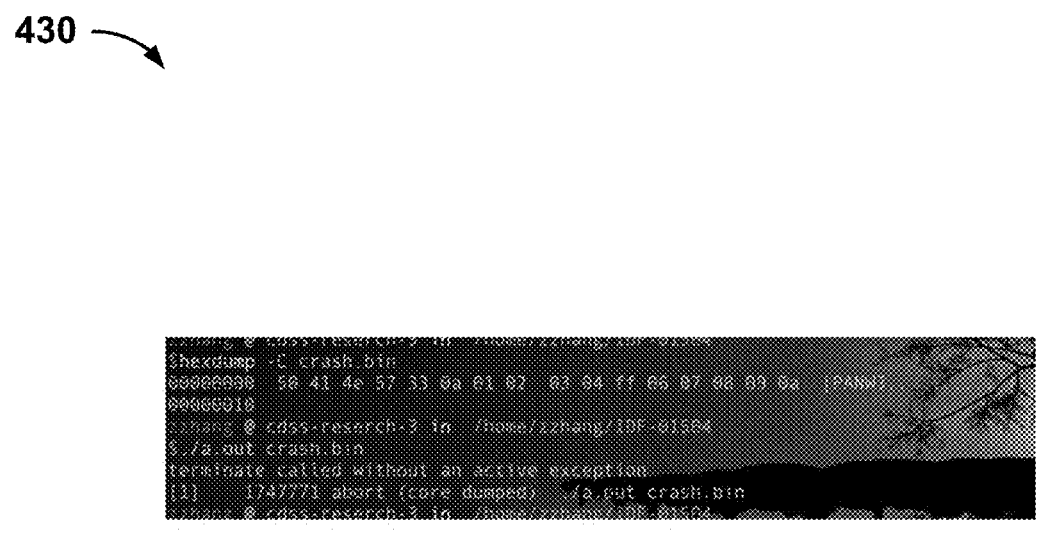
Figure 4D:
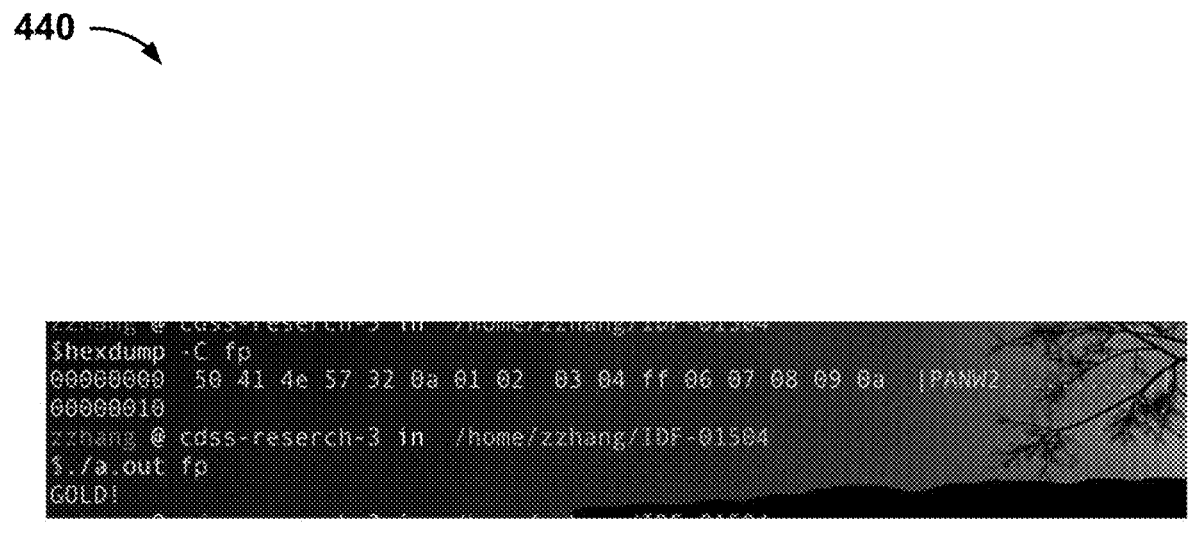
Figure 4E:
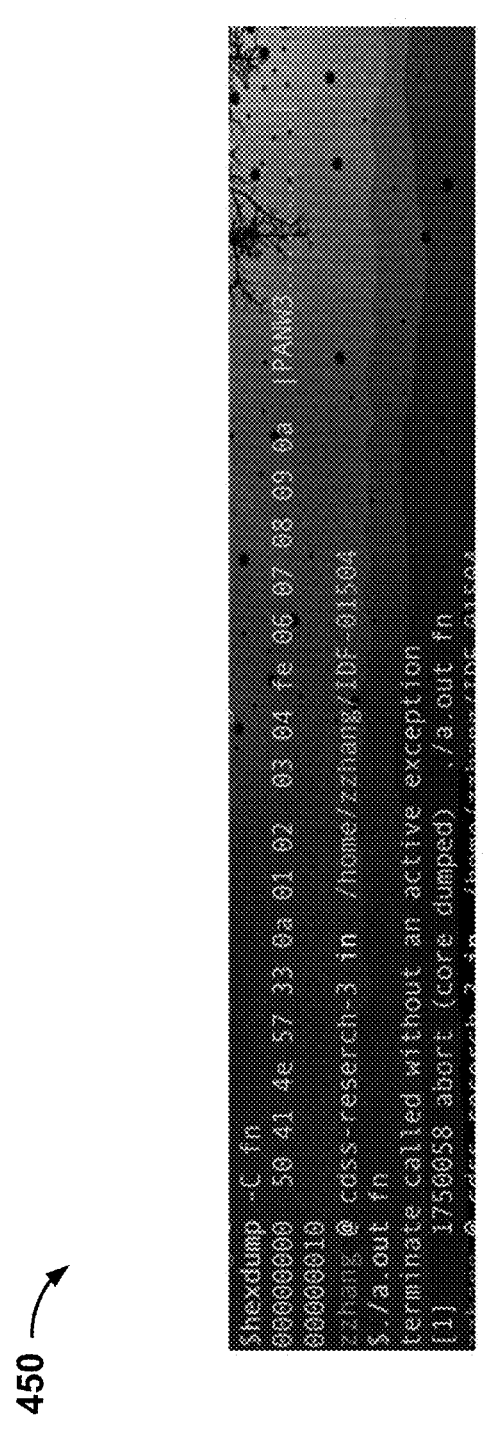

Referring to FIGS. 4A-E, source code for an example application for processing an input file is shown at 410 of FIG. 4A, a clean file (e.g., a clean sample) for inputting into the application is shown at 420 of FIG. 4B, and a malicious file (e.g., a malicious sample) for inputting into the application is shown at 430 of FIG. 4C (e.g., which causes the application to crash in this example). Patterns generated by simply performing a comparison to identify differences between the clean file and the malicious file yield results (e.g., this diffing operation identifies the 11$^{th}$ byte, which is equal to 0xff, as the only difference between these two files). However, this simple diffing operation does not generate an effective malware signature for detecting as it is not the actual root cause of the crash when inputting the malicious sample into the example application. Moreover, using the identified diffs as a malware signature (e.g., the 11$^{th}$ byte is equal to 0xff) is also inaccurate as it can result in false positives as shown at 440 of FIG. 4D, and it can also result in false negatives as illustrated at 450 of FIG. 4E. As such, binary or file diffing operations are not a reliable approach for automated malware signature generation as similarly discussed above.

In contrast, applying the above-described techniques for malicious pattern extraction using fuzzing to malicious file 430, the following patterns can be automatically identified and extracted from the critical path to automatically generate a signature (e.g., in this example, the automated signature is based on the following: 5$^{th}$ byte=0x33, 6$^{th}$ byte <0xf, and 11$^{th}$ byte=0xfb).

Referring to FIGS. 5A-B, source code for a second example malicious sample is shown at 510 of FIG. 5A (e.g., CVE-2020-1557), and an automated signature generation is performed using the above-disclosed techniques for malicious pattern extraction using fuzzing that automatically identifies and extracts the two lines from the malicious sample as shown at 520 of FIG. 5B, which can then be used for the basis for the malware signature for the malicious sample.

Example Pseudo Code for Malicious Pattern Extraction Via Fuzzing

Below is an example pseudo code script (e.g., including the above-described fuzzing component) for implementing the disclosed techniques for malicious pattern extraction via fuzzing.

```
#each file has different input and execution parameters,
#we have implemented harness for different file types
    such as
#PDF, EXE, etc.
from file_parser import exe_analyzer
#For each mutated sample, save the sample path and
    critical mutation path
#from original poc sample
class MutationSample:
    def _init_(self, sample_path):
        self.sample_path=sample_path
        self.critical_path=None
class FuzzingMaliciousPatternExtraction:
    #entry point, passing the poc sample path to the ana-
        lyzer def exe_pattern_extraction(self, sample_path):
        #we run the poc and collect the crash trace which
            contains
        #execution flow all the way to the crash point
        original_crash_trace=exe_analyzer(sample_path)
        #we use previous_sample to store last mutated
            sample
        #current_sample is the current mutated sample
        previous_sample=MutationSample(None)
        current_sample=MutationSample(sample_path, None)
        #if last mutated and current mutated sample are the
            same
        #meaning we have reached the end of mutation
        #we can also set a max mutation count to avoid
            infinite or too many branches
        while previous_sample is None or diff(current-
            _sample,    previous_sample)    or    mutate-
            _count<30000:
            previous_sample=current_sample
            #mutation via fuzzing, save the new mutated
                sample to current_sample and save mutation-
                _path
            #mutation is based on critical mutation path
            #fuzzing can be adding/deleting/changing accord-
                ing to the execution flow
            fuzzing_mutation(current_sample)
            new_crash_trace=exe_analyzer(current_sample-
                .sample_path)
            #we diff the crash trace to see if two samples
                can cause the same crash
            if diff(original_crash_trace, new_crash_trace):
                #set last mutation is invalid
                #roll back to previous mutated sample
            else:
                #this mutation is valid, keep going
        #we can now extract the patterns from the critical
            mutation path
        patterns=pattern_extraction(current_sample)
        return patterns
```

Example Process Embodiments for Malicious Pattern Extraction Via Fuzzing

Figure 6:
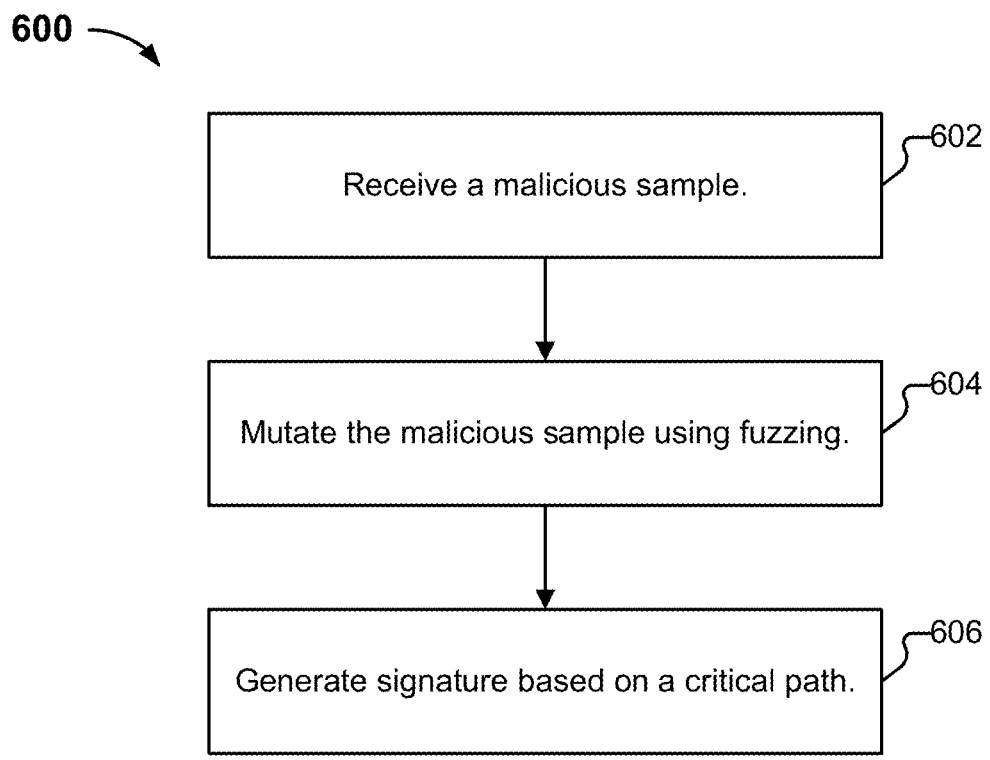
FIG. 6 is a flow diagram of a process for a malicious pattern extractor using fuzzing in accordance with some embodiments.

FIG. 6 is a flow diagram of a process for a malicious pattern extractor using fuzzing in accordance with some embodiments. In some embodiments, a process 600 as shown in FIG. 6 is performed by the malicious pattern extractor using a fuzzing component and techniques as similarly described above including the embodiments described above with respect to FIGS. 1-5B.

At 602, a malicious sample is received, such as similarly described above with respect to FIGS. 1-5B. For example, the malicious sample can be an executable file, such as a binary, script, etc., or a file that includes content for inputting into an application, such as for an office productivity suite or another application.

At 604, the malicious sample is mutated using fuzzing, such as similarly described above with respect to FIGS. 1-5B. For example, an execution flow of the malicious sample can be analyzed to identify mutation targets for fuzzing.

At 606, a signature is generated based on a critical path, such as similarly described above with respect to FIGS. 1-5B. For example, a malware signature can be automatically generated by a cloud security service for detection of the malicious sample, and the cloud security service can distribute the malware signature to a plurality of firewalls and/or other security entities to subscribers of a security service.

Figure 7:
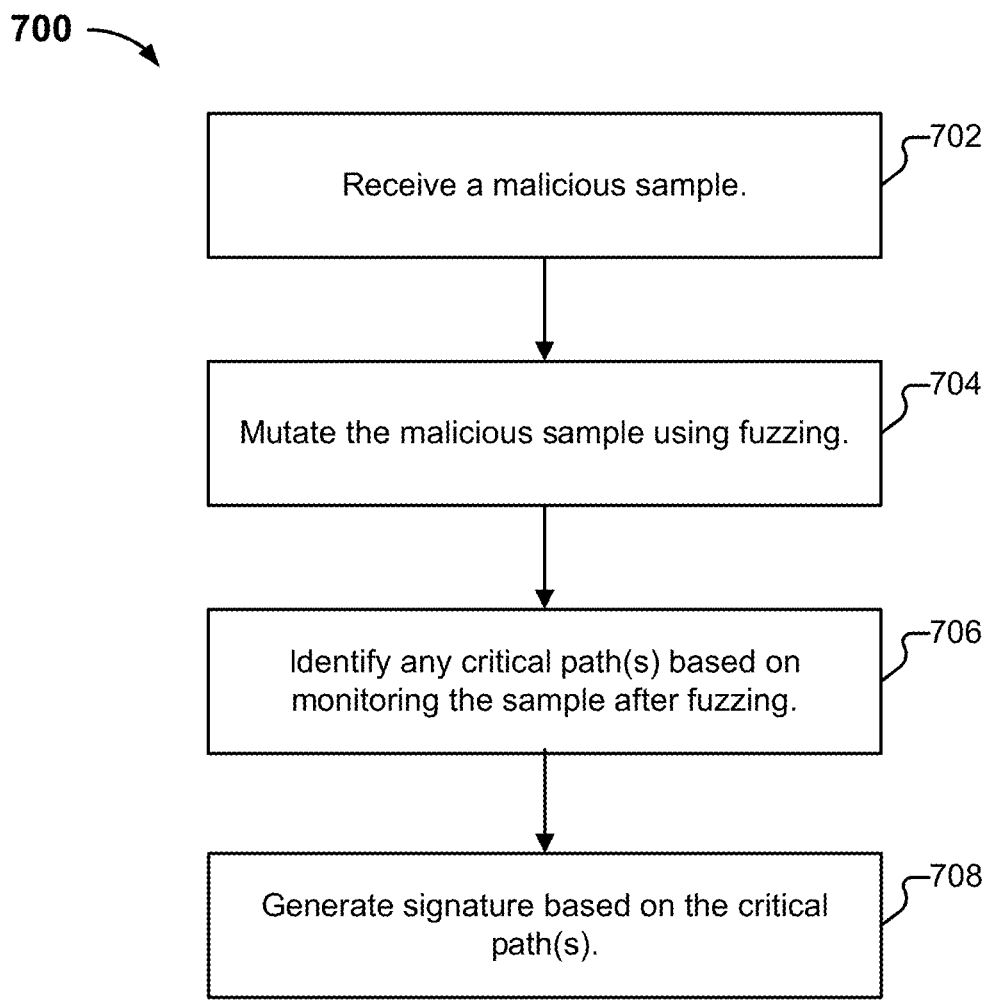
FIG. 7 is another flow diagram of a process for a malicious pattern extractor using fuzzing in accordance with some embodiments.

FIG. 7 is another flow diagram of a process for a malicious pattern extractor using fuzzing in accordance with some embodiments. In some embodiments, a process 700 as shown in FIG. 7 is performed by the malicious pattern extractor using a fuzzing component and techniques as similarly described above including the embodiments described above with respect to FIGS. 1-5B.

At 702, a malicious sample is received, such as similarly described above with respect to FIGS. 1-5B. For example, the malicious sample can be an executable file, such as a binary, script, etc., or a file that includes content for inputting into an application, such as for an office productivity suite or another application.

At 704, the malicious sample is mutated using fuzzing, such as similarly described above with respect to FIGS. 1-5B. For example, an execution flow of the malicious sample can be analyzed to identify mutation targets for fuzzing.

At 706, identifying the critical path(s) for automated signature generation for the malicious sample is performed. For example, execution of the malicious sample can be monitored after each mutation to detect any anomalous behavior and such can be recursively repeated for each branch of execution until no anomalous behavior is detected to facilitate an automated identification of any critical path(s) for automated signature generation for the malicious sample; and then the identified critical path(s) can be used for automated signature generation for the malicious sample, such as similarly described above with respect to FIG. 3.

At 708, a signature is generated based on a critical path, such as similarly described above with respect to FIGS. 1-5B. For example, a malware signature can be automatically generated by a cloud security service for detection of the malicious sample, and the cloud security service can distribute the malware signature to a plurality of firewalls and/or other security entities to subscribers of a security service.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   receive a malicious sample;
   mutate the malicious sample using fuzzing to obtain a critical path, comprising to:
   modify the malicious sample to identify mutation targets for fuzzing;
   determine that a different behavior of the modified malicious sample is observed based on an execution flow of the modified malicious sample;
   in response to a determination that the different behavior of the modified malicious sample is observed, store the observed different behavior of the modified malicious sample; and
   detect the critical path for the malicious sample based on the stored the observed different behavior;
   generate a signature based on the critical path; and
   distribute the signature to a security service for detection of the malicious sample; and
   a memory coupled to the processor and configured to provide the processor with instructions.

2. The system of claim 1, wherein the signature is a malware signature that is automatically generated.

3. The system of claim 1, wherein the signature is a malware signature that is automatically generated by a cloud security service for detection of the malicious sample.

4. The system of claim 1, wherein the signature is a malware signature that is automatically generated by a cloud security service for detection of the malicious sample, and wherein the cloud security service distributes the malware signature to subscribers of a security service.

5. The system of claim 1, wherein the signature is a malware signature that is automatically generated by a cloud security service for detection of the malicious sample, and wherein the cloud security service distributes the malware signature to subscribers of a security service for an intrusion detection system (IDS) and/or an intrusion prevention system (IPS).

6. The system of claim 1, wherein the signature is a malware signature that is automatically generated by a cloud security service for detection of the malicious sample, and wherein the cloud security service distributes the malware signature to a plurality of firewalls to subscribers of a security service.

7. The system of claim 1, wherein the malicious sample is associated with an executable file or a file that includes content for inputting into an application.

8. The system of claim 1, wherein the signature is verified to check for false positives.

9. The system of claim 1, wherein the processor is further configured to:
   analyze execution flow of the malicious sample to identify mutation targets for fuzzing.

10. A method, comprising:
    receiving a malicious sample;
    mutating the malicious sample using fuzzing to obtain a critical path, comprising:
    modifying the malicious sample to identify mutation targets for fuzzing;
    determining that a different behavior of the modified malicious sample is observed based on an execution flow of the modified malicious sample;
    in response to a determination that the different behavior of the modified malicious sample is observed, storing the observed different behavior of the modified malicious sample; and
    detecting the critical path for the malicious sample based on the stored the observed different behavior;
    generating a signature based on the critical path; and
    distributing the signature to a security service for detection of the malicious sample.

11. The method of claim 10, wherein the signature is a malware signature that is automatically generated.

12. The method of claim 10, wherein the signature is a malware signature that is automatically generated by a cloud security service for detection of the malicious sample.

13. The method of claim 10, wherein the signature is a malware signature that is automatically generated by a cloud security service for detection of the malicious sample, and wherein the cloud security service distributes the malware signature to subscribers of a security service.

14. The method of claim 10, wherein the signature is a malware signature that is automatically generated by a cloud security service for detection of the malicious sample, and wherein the cloud security service distributes the malware signature to subscribers of a security service for an intrusion detection system (IDS) and/or an intrusion prevention system (IPS).

15. The method of claim 10, wherein the signature is a malware signature that is automatically generated by a cloud security service for detection of the malicious sample, and wherein the cloud security service distributes the malware signature to a plurality of firewalls to subscribers of a security service.

16. The method of claim 10, wherein the malicious sample is associated with an executable file or a file that includes content for inputting into an application.

17. A computer program product embodied in a tangible non-transitory computer readable storage medium and comprising computer instructions for:
- receiving a malicious sample;
- mutating the malicious sample using fuzzing to obtain a critical path, comprising:
  - modifying the malicious sample to identify mutation targets for fuzzing;
  - determining that a different behavior of the modified malicious sample is observed based on an execution flow of the modified malicious sample;
  - in response to a determination that the different behavior of the modified malicious sample is observed, storing the observed different behavior of the modified malicious sample; and
  - detecting the critical path for the malicious sample based on the stored the observed different behavior;
- generating a signature based on the critical path; and
- distributing the signature to a security service for detection of the malicious sample.

18. The computer program product recited in claim 17, wherein the signature is a malware signature that is automatically generated.

* * * * *